(12) United States Patent
Mullins

(10) Patent No.: US 9,071,958 B2
(45) Date of Patent: Jun. 30, 2015

(54) SYSTEMS AND METHODS TO REMOTELY RESTRICT THE USE OF MOBILE DEVICE

(71) Applicant: Lisa Marie Mullins, Irvine, CA (US)

(72) Inventor: Lisa Marie Mullins, Irvine, CA (US)

(73) Assignee: Lisa Marie Mullins, Irvine, CA (US)

( * ) Notice: Subject to any disclaimer, the term of this patent is extended or adjusted under 35 U.S.C. 154(b) by 73 days.

(21) Appl. No.: 14/030,981

(22) Filed: Sep. 18, 2013

(65) Prior Publication Data
US 2015/0079965 A1 Mar. 19, 2015

(51) Int. Cl.
*H04M 3/00* (2006.01)
*H04W 8/22* (2009.01)

(52) U.S. Cl.
CPC ...................... *H04W 8/22* (2013.01)

(58) Field of Classification Search
CPC .. H04W 8/245; H04W 8/265; H04M 1/72525
USPC ................... 455/419, 418, 421, 432.1, 456.1
See application file for complete search history.

(56) References Cited

U.S. PATENT DOCUMENTS

2014/0148137 A1* 5/2014 Weng et al. ................ 455/414.1

* cited by examiner

*Primary Examiner* — Nghi H Ly
(74) *Attorney, Agent, or Firm* — Steve Hassid; Chen Huang; Partners Law Group, Inc.

(57) ABSTRACT

A parental control system which allows a user to remotely administrate another user's use of mobile device. The system comprises a non-transitory computer-readable medium storing software that is installed on a computer or first mobile device allowing user of the computer or the first mobile device to send, either directly or through third-party service provider, a set of instructions through internet or mobile network; and a second mobile device, which receives the set of instructions and executes the set of instructions on the second mobile device. The set of instructions include at least time or duration the second mobile device is incapable of sending or receiving text message or phone calls and once the time or duration has expired the second mobile device is re-enabled and capable of sending or receiving text message or phone calls. When software on the second mobile device detects that the second mobile device is moving above a preset speed, it prevents the second mobile device from sending or receiving text messages or making or receiving phone calls.

20 Claims, 14 Drawing Sheets

Client Side

SYSTEMS AND METHODS TO REMOTELY RESTRICT THE USE OF MOBILE DEVICE

FIELD OF THE DISCLOSURE

The present disclosure relates to systems and methods of remotely restricting the use of mobile device. More particularly, the present disclosure relates to a parental control system which allows parents to remotely administrate their children's use of mobile device.

BACKGROUND

Modern mobile phones can perform a wide variety of functions, such as taking and sending photographs and video, playing music and games, and surfing the internet and accessing social networks. As prices of both phones and calls have come down in the past decades, they have become much more affordable for young people and kids are getting mobile phones at younger ages.

A 2010 Pew Internet and American Life Project study revealed that 75 percent of kids ages 12 to 17 own a cell phone. The majority of kids—66 percent—got their first phones before their 14th birthday. However, overuse of smartphones can be detrimental to kids. There are studies showing that smartphone games and applications designed for kids can actually discourage them from interacting with other kids and people around them. Traditional playtime may eventually be a thing of the past with the presence of all these highly technological games. In addition, excessive exposure to the use of smartphones at an early age can trigger poor eye sight for kids because their eyes would constantly have to adjust to the phone screen which can also be a cause for headaches and even migraines at a very young age. Similarly to the overuse of internet, smartphone's online and video games are terribly addicting so it is highly likely that kids will spend hours playing on smartphones if they get hooked on a particular game. Thus, they might spend more time on smartphone games than necessary and neglect their school works.

With the popularization of social media networks such as Facebook® and Twitter®, there are kids finding cyberbullying or sending sexually provocative pictures, messages or video clips via a smartphone fun and easy because they generally have not fully developed the sense of morality and empathy. Cyberbullying, in particular, has been an epidemic that is occurring in almost every country where mobile device is prevalent. In extreme cases, victims of cyberbullying have taken their own lives.

Parents may be able to prevent some of these problems by physically take away their kids' mobile phone at times they don't want their kids to use it (i.e., ground their kids from using their mobile devices for a specific time). They can also read their kids' text message or email through their kids' mobile phone to see if they are sending improper messages to or receiving improper messages from others. However, such measures are not always effective because kids may have deleted messages they don't want their parents to see. In addition, parents may not want to take away their kids' mobile phone all the time because they want their kids to be reachable in case of emergency, which is one of the top reasons most parents give their kids mobile phone in the first place.

Accordingly, there exists a need to provide a system and method where parents can effectively monitor and restrict their kids' use of mobile phone. There also exists a need for parents to ground their kids' use of mobile phone without the need of physically taking the mobile phone away. Lastly, there also exists a need for parents to control text messages received by their kids.

SUMMARY OF THE INVENTION

The major objective of the present disclosure is to provide systems and methods for parents to remotely administrate and restrict their kids' use of smartphone.

Another objective of the present disclosure is to provide systems and methods allowing parents to immediately ground their kids' use of mobile phone.

In accordance with one aspect of at least one embodiment of the present disclosure, a system is provided for use in connection with virtually all types of mobile device. The system comprises 1) a non-transitory computer-readable medium storing software that is installed on a computer or first mobile device allowing user of the computer or the first mobile device to send, either directly or through third-party service provider, a set of instructions through internet or mobile network and 2) a second mobile device which receives and executes the set of instructions. The set of instructions include at least time or duration the ability of the second mobile device to send or receive text message or phone call is disabled and once the time or duration has expired the second mobile device is re-enabled and capable of sending or receiving text message or phone calls. When a correct login or password or instructions from the first mobile device is provided, the second mobile device will be allowed to send or receive text messages or phone calls. In addition, software on the second mobile device detects if the second mobile device is moving and prevents the second mobile device from sending or receiving text messages or phone calls if the second mobile device is moving at or greater to a preset speed.

In another aspect of at least one embodiment of the present disclosure, the method allowing the parents to remotely administrate their kids' mobile device comprises providing a non-transitory computer-readable medium storing software comprising instructions executable by one or more computers or mobile devices which, upon such execution, cause the one or more computers or mobile devices to perform operations comprising: 1) allowing a computer or a first mobile device to restrict a second mobile device from sending or receiving text message or phone call for a time or duration specified; 2) allowing the computer or the first mobile device to prevent the second mobile device from sending or receiving text message or phone call when the second mobile device is moving above a preset speed; 3) allowing the computer or the first mobile devices to redirect or receive text message sent to the second mobile device; and 4) sending notification from second mobile device to the computer or the first mobile devices when the user of the second mobile device is attempting to disable its GPS function.

In yet another aspect of at least one embodiment of the present disclosure, the method of having a mobile device being remotely administrated by another mobile device or computer comprises providing a non-transitory computer-readable medium storing software comprising instructions executable by one or more computers or mobile devices which, upon such execution, cause the one or more computers or mobile devices to perform operations comprising: 1) allowing a second mobile device to receive a set of restrictions from a computer or a first mobile device wherein the set of restrictions include at least time or duration the second mobile device is incapable of sending or receiving text message or phone call or accessing internet; 2) re-enabling the second mobile device to send or receive text message or phone call or access internet once the time or duration specified by the set of restriction has expired or when a correct password is provided to the second mobile device; 3) making the second mobile device to notify the computer or first mobile device when the user of the second mobile device is attempting to disable or reconfigure the software or when the user of the second mobile device is attempting to disable GPS function of the second mobile device; 4) detecting the moving speed of the second mobile device and if the speed is greater than a preset speed, preventing the second mobile device from sending or receiving text message or phone call and accessing internet; 5) storing text messages that were sent to the second mobile device during the time or duration the second mobile device is incapable of sending or receiving text message and optionally resending those text messages to the second mobile device when the second mobile device is re-enabled and capable of sending or receiving text message or phone calls; and 6) displaying, in the second mobile device, list of phone calls made to the second mobile device during the time or duration the second mobile is incapable of sending or receiving phone call when the second mobile device is re-enabled and capable of sending or receiving text message or phone calls.

The foregoing and other objects, features and advantages of the present disclosure are more readily apparent from the detailed description of the preferred embodiments set forth below, taken in conjunction with the accompanying drawings.

DETAILED DESCRIPTION OF THE INVENTION

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

Broadly, embodiments of the present disclosure generally provide systems and methods of a parental control system where parents (administrator side) are able to remotely administrate their children's (client side) use of mobile device.

Figure 1:
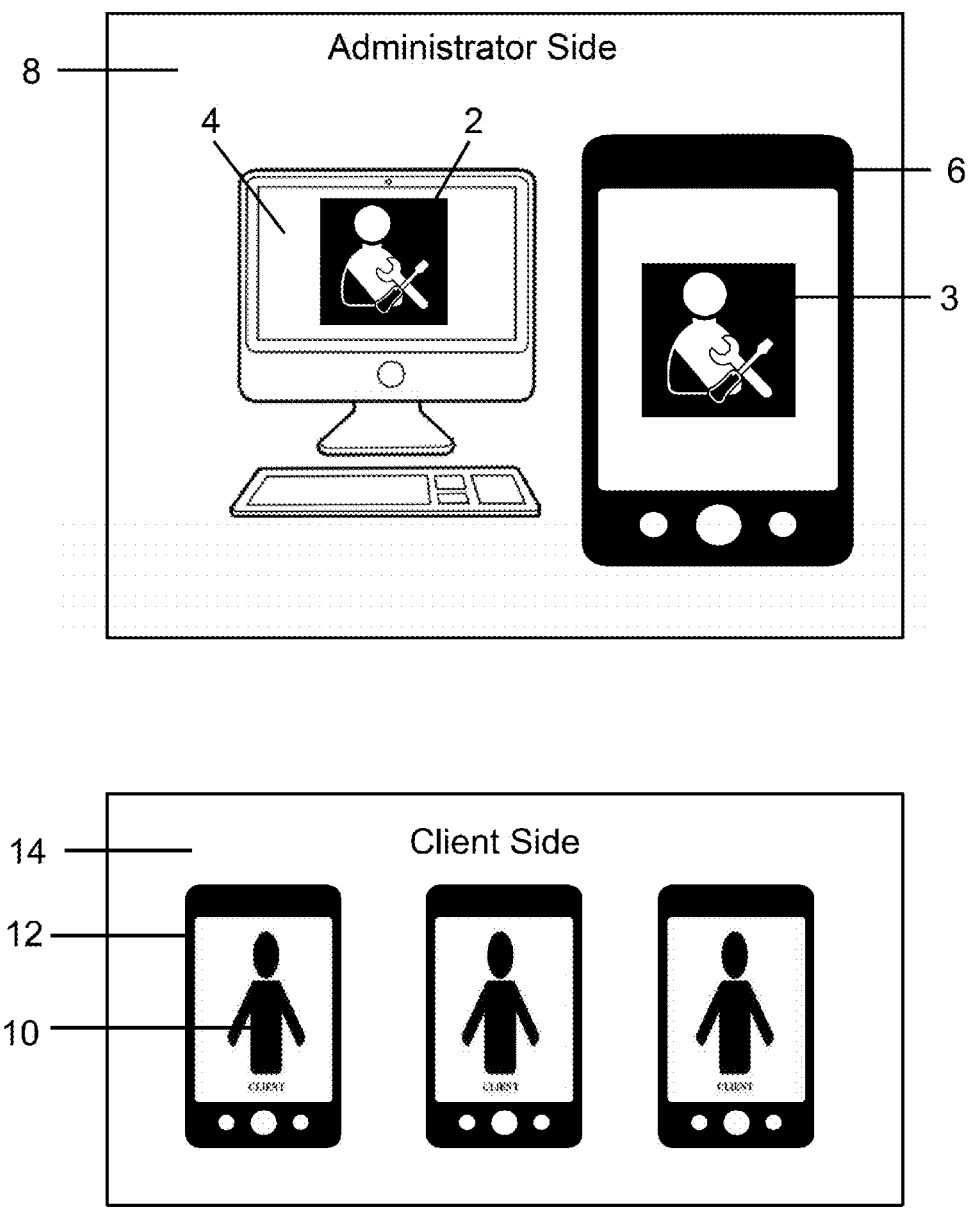
FIG. 1 is an exemplary embodiment showing how the present disclosure can be implemented on computer and/or mobile device.

FIG. 1 is an exemplary embodiment showing how the system of the present disclosure is implemented on computer and/or mobile device. The system comprises an administrator software 2 that is installed on a computer 4 or an administrator mobile application 3 that is installed on an administrator mobile device 6 (collectively as "administrator side" 8) and a client mobile application 10 that is installed on at least one client mobile device 12, the mobile device which the administrator side 8 wants to administrate remotely (collectively as "client side" 14). The administrator mobile device 6 and the client mobile device 12 can be a mobile phone, smartphone, tablet computer or PDA capable of installing mobile application and the computer 4 can be a desktop or laptop computer.

Figure 2:
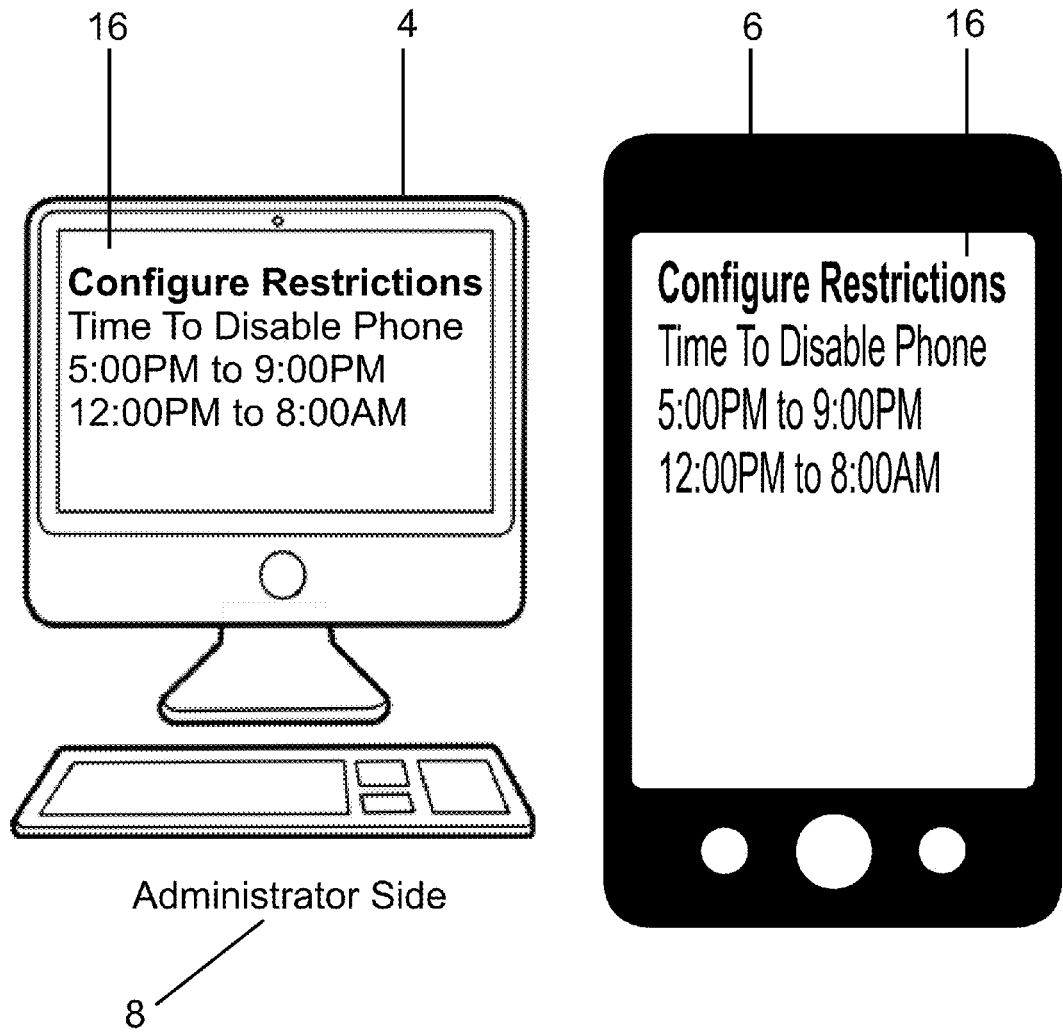
FIG. 2 is an exemplary embodiment of the present disclosure showing how set of instructions are configured on the administrator side.

As FIG. 2 shows, the administrator software 2 or the administrator mobile application 3 provides the user of the administrator side 8 ("the administrator") with an interface allowing the administrator to configure a set of instructions 16 of which the administrator wants to apply on the client mobile device 12. The set of instructions generally include time (i.e., from 5:00 PM to 9:00 PM) or duration (i.e., next 4 hours) which the administrator wants to restrict client mobile device's 12 ability to access text messages, phone call, internet and/or application (i.e., gaming applications). The set of instructions can be one time only instructions, or they can be set on recurrent basis (i.e. daily, weekly, family dinner time or school hours).

Figure 11:
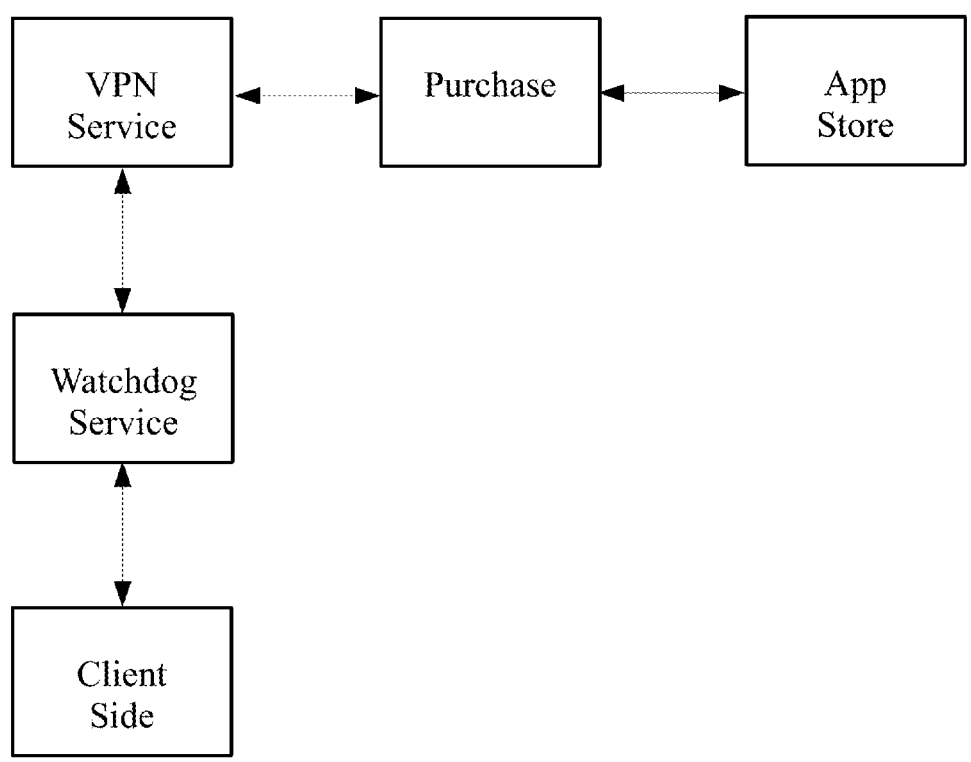
FIG. 11 is an exemplary embodiment of the present disclosure showing how to restrict download of mobile app and in-app purchase.
Figure 13:
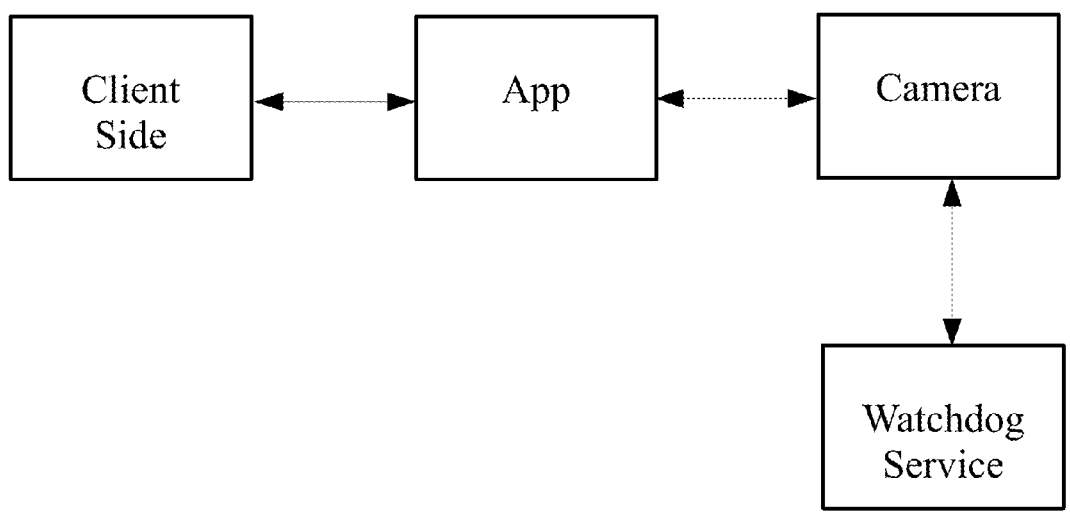
FIG. 13 is an exemplary embodiment of the present disclosure showing how to restrict the use of camera.

The set of instruction can optionally include a list of authorized contacts (i.e., email address or phone number) that the client mobile device is allowed/or not allowed to call or text during the restriction period. The administrator is also allowed to configure the set of instructions to include amount of data, Wi-Fi and internet the client mobile device can use and the specific application the client mobile can or cannot access. The administrator can further configure the set of instructions to restrict the use of client mobile device's 12 camera and/or the client mobile device's 12 ability to download or purchase mobile application, including in-app purchases. This can be done by using any commercial known watchdog service or public APIs such as Service and Activity Manager for restricting download or purchase of mobile application and Device Admin Receiver, Device Policy Manager and Device Admin Info for restricting the use of camera as shown in FIGS. 11 and 13 respectively. The client mobile application 10 allows the administrator software 2 or the administrator mobile application 3 to remotely access the phone book and list of applications of the client mobile device 12.

In another embodiment of the present disclosure, the administrator software 2 or the administrator mobile application 3 of the system is password protected so that the set of instruction 16 cannot be configured or disabled from the administrator side 8 unless a correct password is entered.

Figure 3:
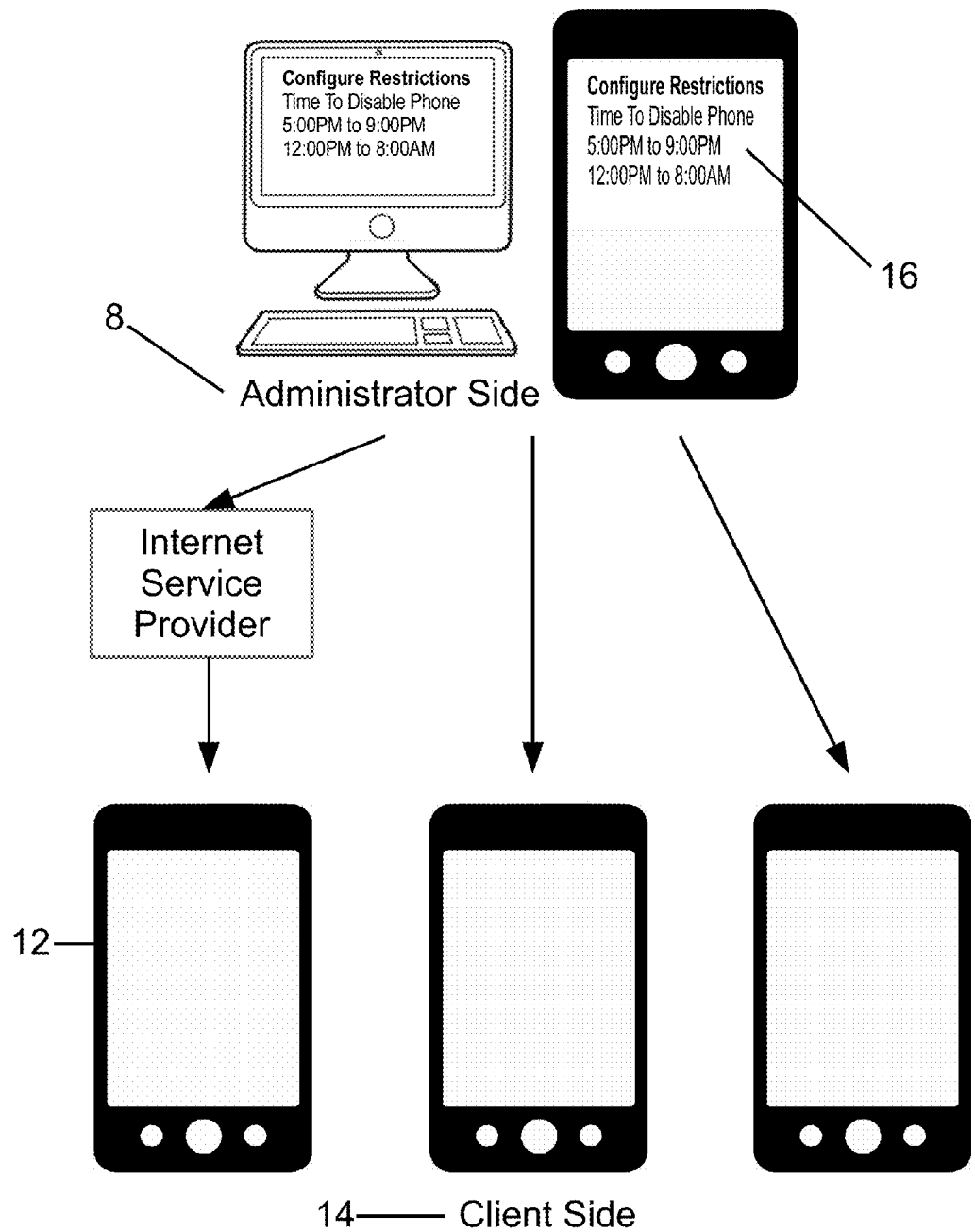
FIG. 3 is an exemplary embodiment of the present disclosure showing how set of instructions are transmitted from the administrator side to the client side.

As FIG. 3 shows, after the administrator configured the set of instructions 16, the set of instructions 16 is transmitted from the administrator side 8 (via administrator software 2 or the administrator mobile application 3) to the client mobile application 10 of the client mobile device 12. The set of instructions can be transmitted directly to the client mobile device 12 (i.e., Bluetooth or area-network) or indirectly via third party service provider (i.e., internet service provider or mobile service provider).

Figure 7:
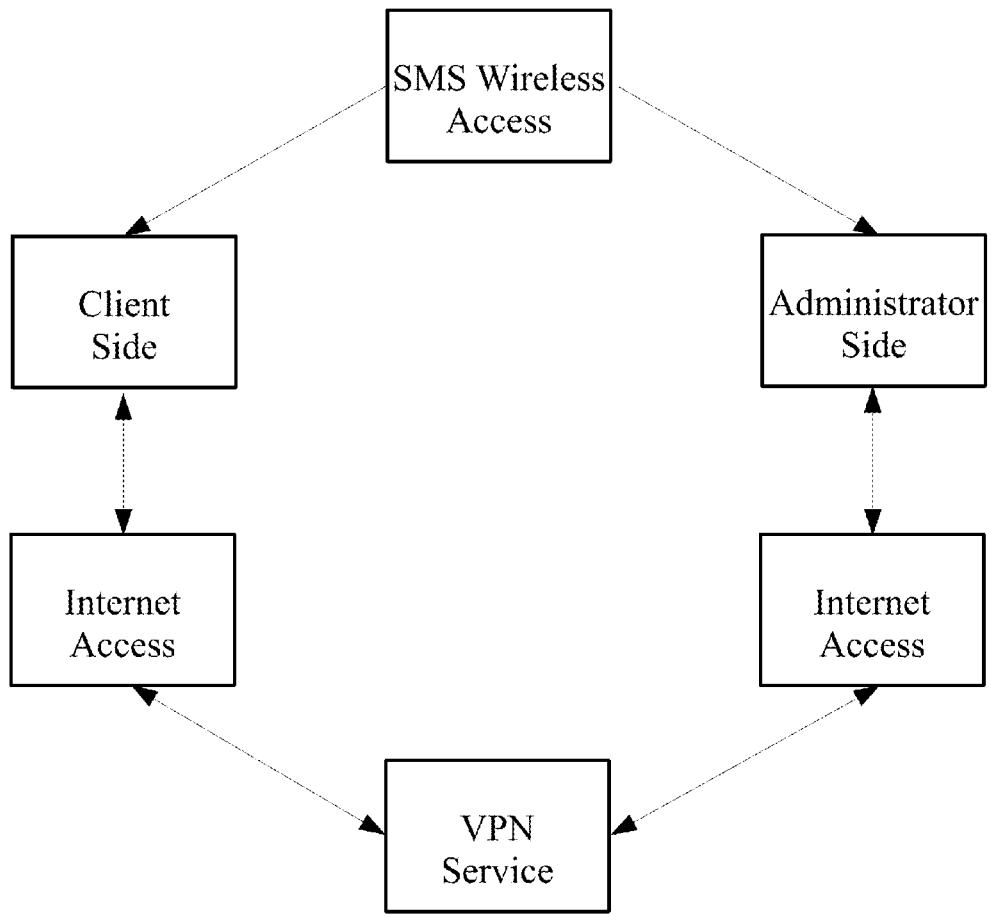
FIG. 7 is an exemplary embodiment of the present disclosure showing how the administrator side transmits the set of instructions to the client side.

FIG. 7 is an exemplary embodiment of the present disclosure showing how the administrator side 8 transmits the set of instructions 16 to the client side 14. The transmission is based on TCP socket connection between administrator side 8 and client side 14. A custom commands protocol will be implemented on top of this technology (i.e., using public API Service). The protocol will be optimized to minimize traffic usage. To send the set of instructions 16 commands, the administrator software 2 or the administrator mobile application 3 will connect through the computer's internet access or mobile device's wireless access point to the client mobile application 10. Similarly, the client mobile application 10 will submit notifications to the administrator software 2 or the administrator mobile application 3 through client mobile device's 12 wireless access point to the VPN service.

An additional method to control the client mobile device 12 is the use of hidden SMS conversation between phones. For example, the Android API provides a mechanism for hidden SMS sending/receiving, meaning that these messages will not appear within SMS application. A small SMS-based control protocol has shown to work well. As a backup remote access method, the administrator side 8 and the client side 14 will connect remotely using the SMS wireless access option if The TCP socket connection is unavailable.

Figure 4:
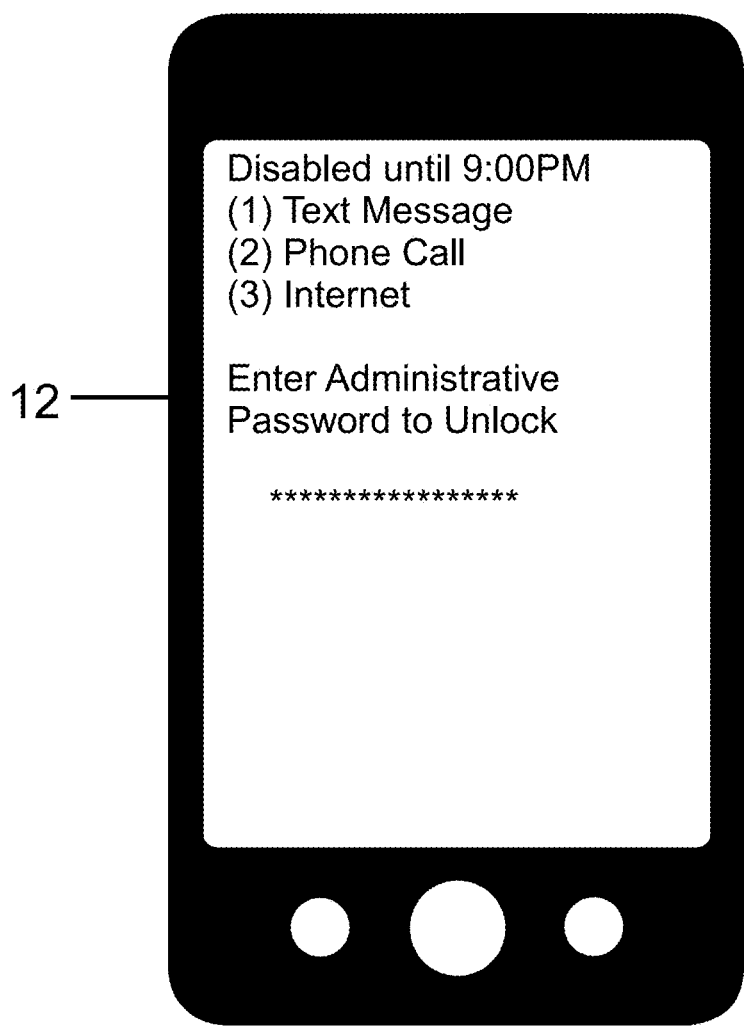
FIG. 4 is an exemplary embodiment of the present disclosure showing how the client side executes the set of instructions.

As illustrated by FIG. 4, once the client mobile application 10 receives the set of instructions, the client mobile application 10 will executes and apply the set of instructions 16 on the client mobile device 12. The client mobile device will not be able to have full access to the text message, phone call and/or internet as specified by the set of instructions 16. For example and not by way of limitation, suppose the administrator configured the set of instruction 16 to include 1) no text message, phone call and internet from 5:00 PM to 9:00 PM (can be set as one time or recurring such as daily or weekly) except to or from authorized contacts Mom and Dad; 2) no mobile application allowed except authorized app Calculator and 3) all data, Wi-Fi and internet function disabled during the time specified. Once the client mobile device 12 receives the set of instructions, the client mobile device 12 will be unable to receive calls from or contact anyone except Mom and Dad, or have access to the data, Wi-Fi and internet from 5:00 PM to 9:00 PM. In addition, the client mobile device 12 can only access the Calculator application during the time specified. Note that the same set of instruction can apply to multiple client mobile devices 12 at same time, or each client mobile device 12 can have its own set of instructions that differs from other client mobile device 12.

Figure 8:
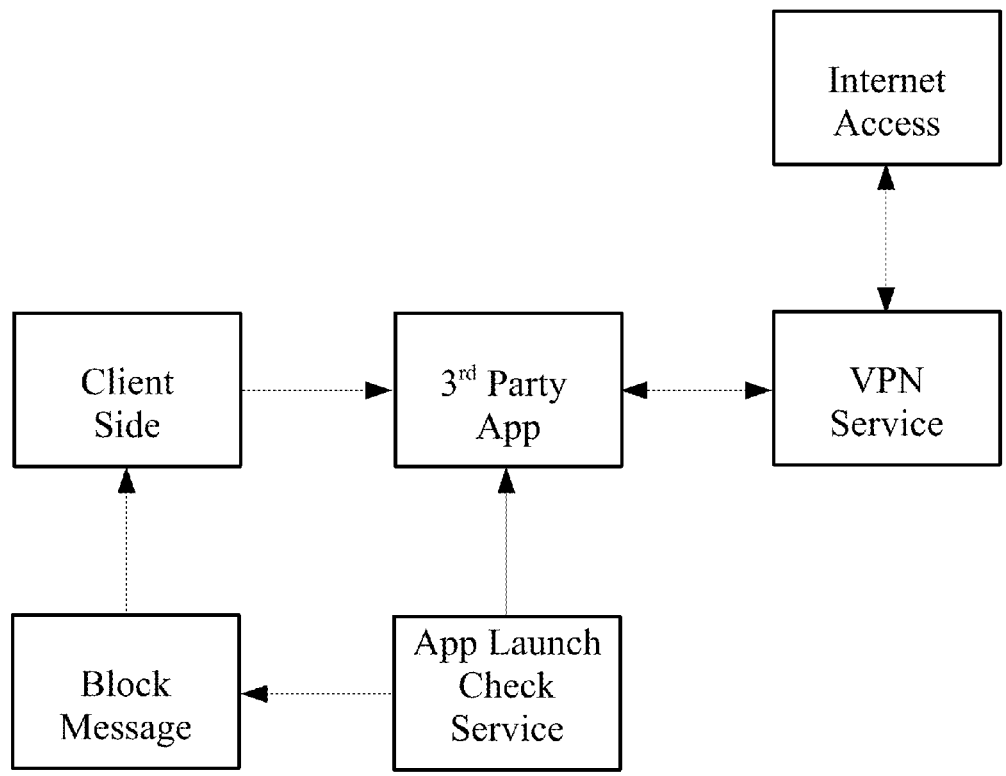
FIG. 8 is an exemplary embodiment of the present disclosure showing how usage of applications is restricted.

The restriction of application can be done in various ways. In one preferred embodiment of the present disclosure as shown in FIG. 8, the client mobile application 10 includes a background service which will poll the top screen application package using a configured interval and start client mobile application's 10 blocked screen immediately if it finds a restricted application is launching. This can be done by using public API Service and Activity Manager.

Figure 10:
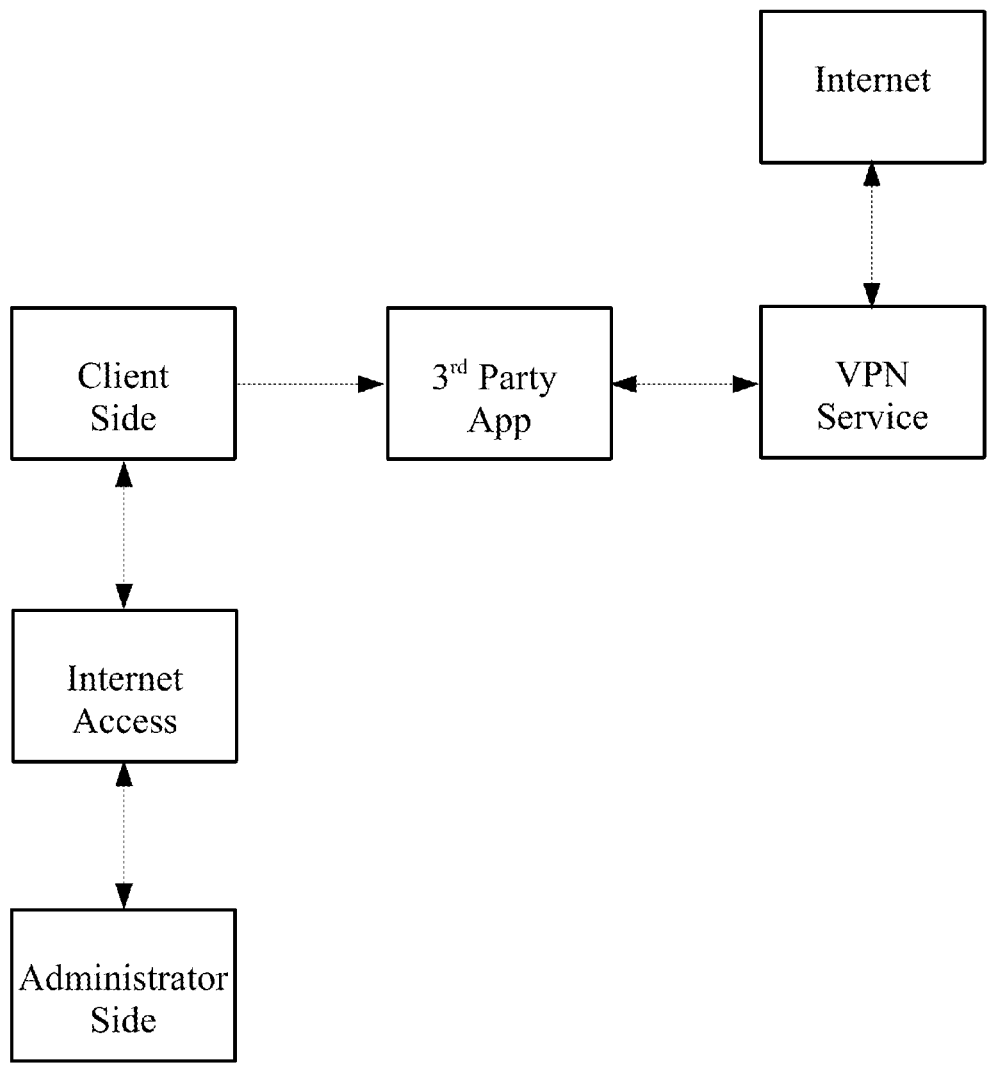
FIG. 10 is an exemplary embodiment of the present disclosure showing how internet or Wi-Fi is restricted.

FIG. 10 is an exemplary embodiment of the present disclosure showing how client mobile device's 12 access to internet or Wi-Fi can be restricted. In one preferred embodiment, the client mobile application 10 is capable of configuring the firewall rules of the client mobile device 12. Thus, the firewall rules can be configured to deny all incoming and outgoing internet or Wi-Fi connections. In another preferred embodiment, a customized VPN service is created. Thus, after the client mobile device 12 is connected to the VPN, all application traffic will direct through that service. The administrator can turn the service off to allow the client mobile device 12 to have full access to the internet.

All the restricted features (i.e., text message, phone call, internet etc.) on the client mobile device 12 will be re-enabled once the restricted period has passed, or if the administrator cancels the restrictions from the administrator side 8.

The administrator software 2 or the administrator mobile application 3 also provides the administrator with a function where the administrator can immediately restrict the use of the client mobile devices 12 without the need to configure time or duration in advance. For example, the administrator software 2 or the administrator mobile application 3 can provide a simple on-screen button where the administrator can simply restrict client mobile device's 12 access to phone call, text message and internet feature with a simple click or press on the button. The restriction will not end until the administrator disables the restriction such as clicking or pressing the button again or enter an administrator password on the restricted client mobile device.

Figure 9:
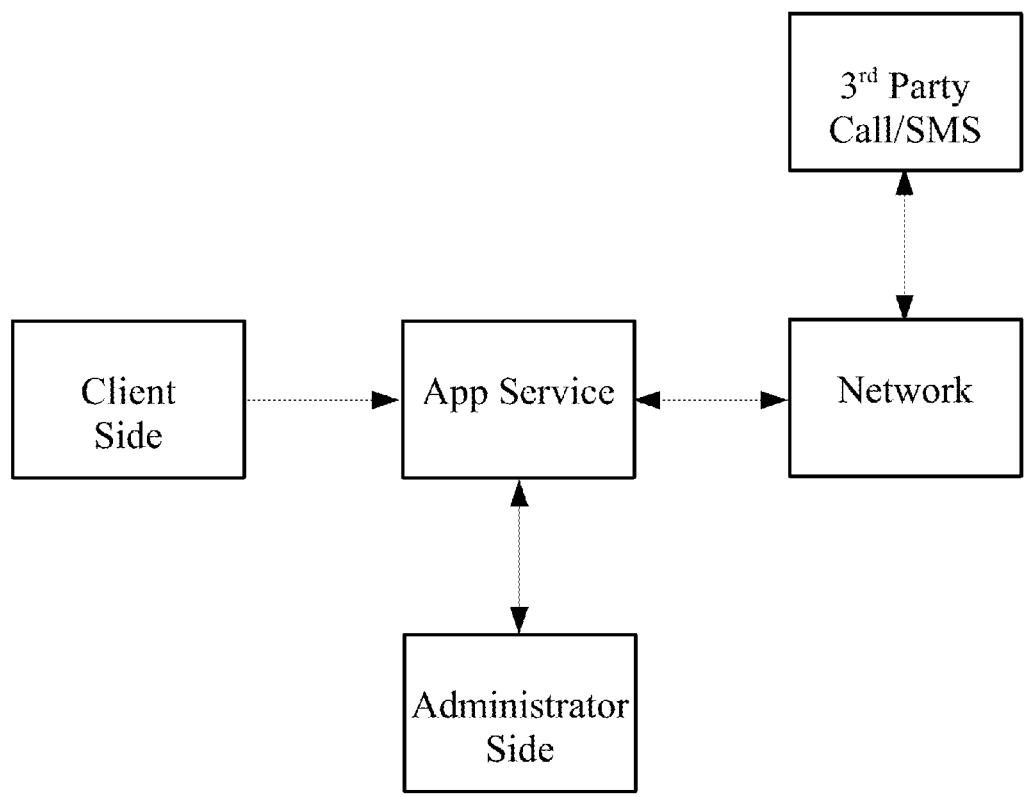
FIG. 9 is an exemplary embodiment of the present disclosure showing how calls and SMS messages are managed.

In one embodiment of the present disclosure, the system will store any incoming text messages, emails and/or records of phone calls made to the client mobile device 12 during the restriction period in the administrator mobile device 6, the third party service provider and/or the client mobile device 12. When the restriction period has passed or cancelled, the user of the client mobile device 12 will be able to retrieve the missed text messages and emails, and will also be able to see the records of missed phone calls. The administrator software 2 or the administrator mobile application 3 also allows the administrator to disable this function or to delete those text messages, emails and records so that the client mobile device 12 will miss out all the activities (i.e., incoming phone calls and text messages) during the restriction period. This can additional be served as a way to punish the user of the client mobile device 12. As FIG. 9 shows, the management of incoming calls and text messages can be done by placing the client mobile application 10 on the highest priority in the client mobile device 12 to process incoming calls and SMS messages. By doing this, the client mobile application 10 will be the first system component in the client mobile device 12 to process all calls and messages. For example, and not by way of limitation, the client mobile application 10 can use public API class (i.e., Telephony Manager, SMS Message and Broadcast Receiver etc.) and the hidden API class (i.e., ITelephony) which provides the ability to hang-up unacceptable calls silently. For text messages, the client mobile application 10 can be configured to cancel system ordered broadcast if the text message is not acceptable so that no other programs will receive that text messaged. The text message can be diverted to the administrator mobile device 6 if the administrator desires.

In yet another embodiment of the present disclosure, during the restriction period, emails sent to the client mobile device 12 will be blocked but will not be deleted from the email server. Once the restriction period has expired or cancelled by the administrator, the client mobile device 12 will be capable of retrieving these emails.

In yet another embodiment of the present disclosure, the client mobile application 10 will automatically send a preset or auto-generated text message to phone number that tried to call or text client mobile device 12 during the restriction period notifying the sender of text message or caller that the user of the client mobile device 12 is incapable of answering the phone or replying text message. The notification message can optionally include what time the user of the client mobile device 12 will become available.

Figure 5:
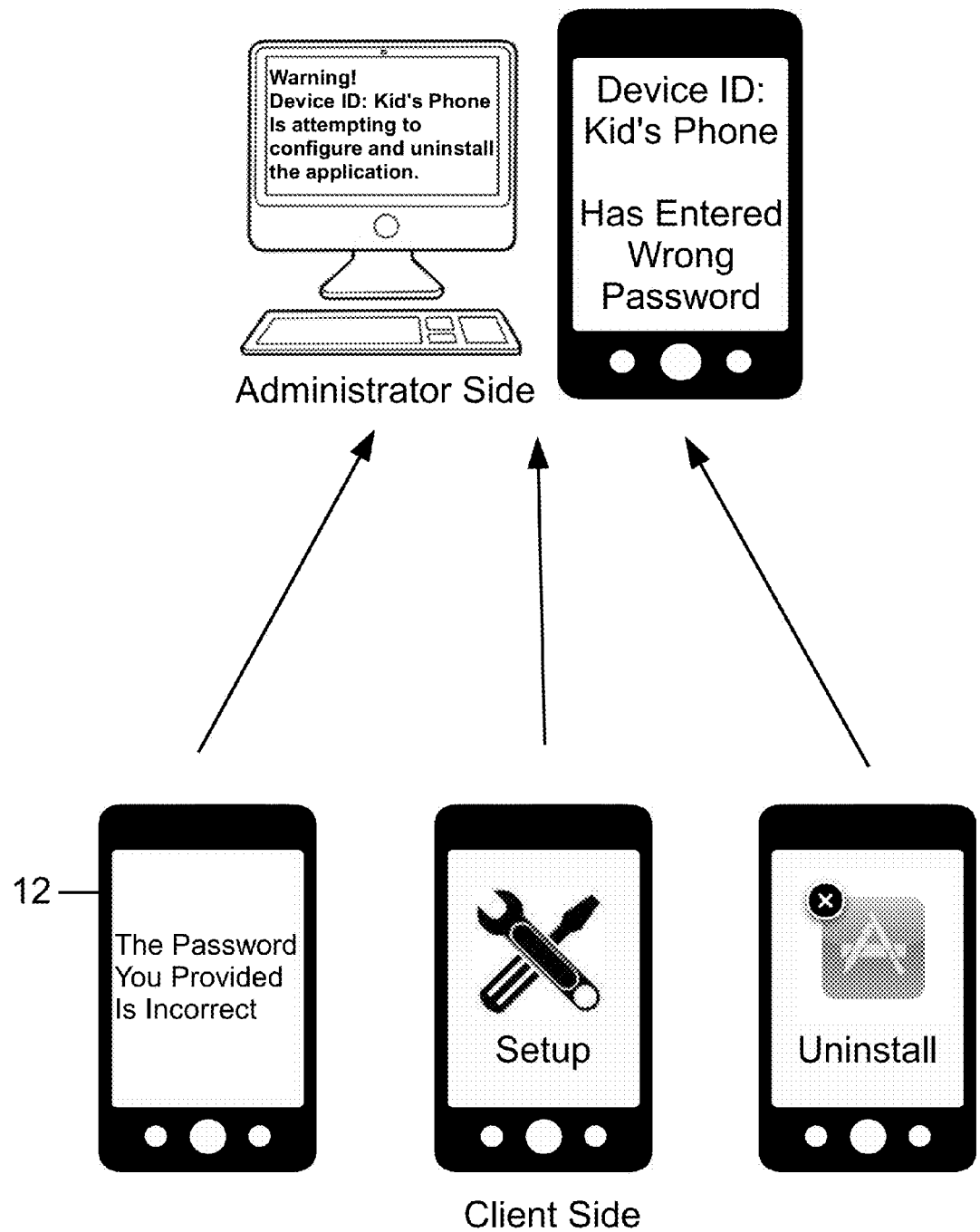
FIG. 5 is an exemplary embodiment of the present disclosure showing how the client side notifies the administrator side when the client side attempts to configure or uninstall the application or inputs wrong password to disable the application.

As FIG. 3 shows, the client mobile device 12 is also password protected where the user of the client mobile application 10 can optionally cancel the restrictions by providing the correct password to the client mobile application 10. However, if wrong password is entered, or if the user of the client mobile device 12 is attempting to configure or uninstall the client mobile application 10, the client mobile application 10 will automatically send a notification message (i.e., via text message, email or device notification) to the administrator side 8 notifying the administrator that the user of the client mobile device 12 is attempting to disable, configure or uninstall the client mobile application 10 as shown in FIG. 5. The client mobile application 10 will also send a notification or warning message to the administrator side 8 when the Subscriber Identity Module (SIM) card of the client mobile device has been changed or removed.

Figure 12:
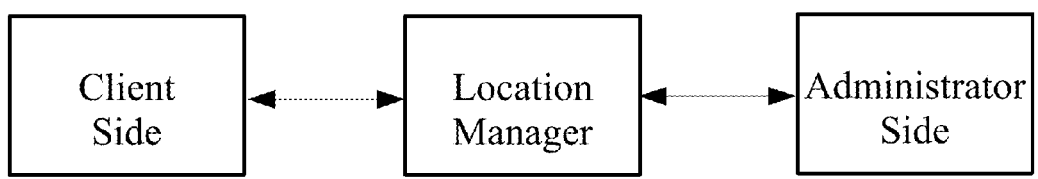
FIG. 12 is an exemplary embodiment of the present disclosure showing how GPS function can be protected from being disabled.

In another embodiment of the present disclosure, the system further allows the administrator side 8 to monitor the location of the client side 14 based on the GPS location of the client mobile device 12. The client mobile application 10 will notify the administrator when it detects that the client mobile device 12 is not within a geographic location at certain time. For example and not by way of limitation, the parents can configure the client mobile application 10 to alert them whenever the client mobile application 10 detects their kids' client mobile device 12 is not within school zone during school hours. The client mobile application 10 can also be configured to prevent the GPS function of the client mobile device 12 from being disabled during the restriction period or at all time. The client mobile application 10 will send a notification to the administrator side 8 when it detects that there is an attempt to disable the GPS. For example, in one preferred embodiment of the present disclosure as shown in FIG. 12, this is done by detecting the GPS status changes (i.e. ON/OFF) through the public API Location Manager. Once the Location Manager detects the changes, the client mobile application 10 will send a notification to the administrator.

Figure 14:
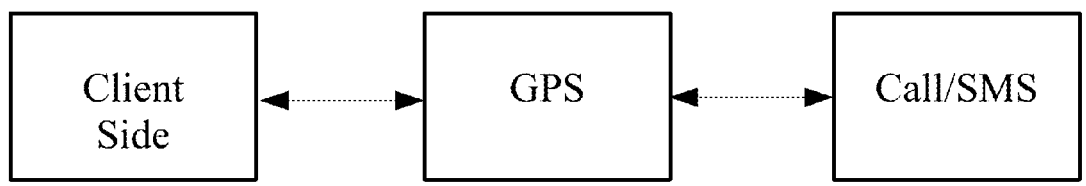
FIG. 14 is an exemplary embodiment of the present disclosure showing how to disable Call/SMS function during driving.

In yet another embodiment of the present disclosure, the client mobile application 10 will disable the text message, phone call and/or internet features of the client mobile device 12 when the client mobile application 10 detects that the client mobile device 12 is moving above a preset speed (i.e., 10 MPH). However, the client mobile device 12 will still be able to contact emergency numbers such as 911 or numbers authorized by the administrator (i.e., parents' phone numbers). If the user of the client mobile device 12 is attempting to make a call, access text message, or access internet while moving above the preset speed, the client mobile application 10 will send a notification to the administrator to inform the administrator. The speed of the client mobile device can be measured based on the GPS location of the client mobile device 12, such as how far the client mobile device 12 has travelled within a frame of time or any other known means. It can also be done using public API such as Location Manager which is capable of obtaining current speed of a moving object as shown in FIG. 14. The purpose of including such function is to prevent user of the client mobile device 12 from using the mobile phone while driving. However, such function can always be disabled remotely by the administrator in case that the user of the client mobile device 12 is travelling in a car but is not driving (i.e., as passenger) or in a train. The client mobile application 10 will allow user of the client mobile device 12 to send a request to the administrator requesting the administrator to disable the function.

In yet another embodiment of the present disclosure, while the client mobile application 10 disables the text message, phone call and/or internet features of the client mobile device 12 as it detects that the client mobile device 12 is moving above a preset speed, the client mobile application 10 will automatically direct all incoming calls to client mobile device's 12 voicemail. The client mobile application 10 can also be configured to include autoreply so that whenever a person is texting or calling the client mobile device 12, the client mobile application will send a text message to the person notifying that the person that the user of the client mobile device 12 is driving or unable to answer or reply.

All the text messages sent to the client mobile device 12 will also be stored by the client mobile application 10 and they will be accessible once the client mobile device 12 is travelling below the preset speed or the administrator disables the function.

Figure 6:
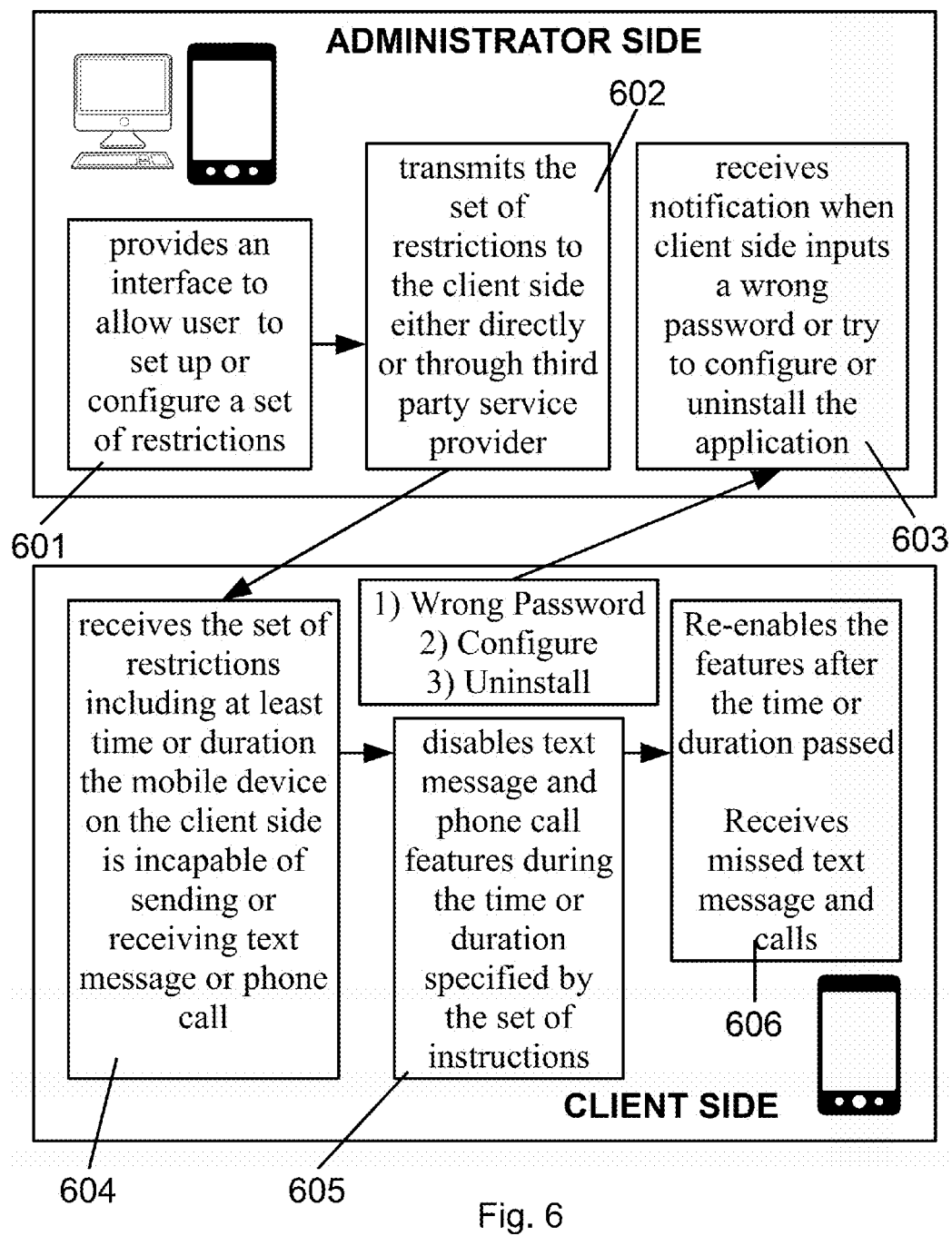
FIG. 6 is a process flow diagram showing an exemplary embodiment of the present disclosure.

FIG. 6 is a process flow diagram showing the methods of how to remotely restrict the use of mobile device in accordance with the present disclosure on both the administrator side and client side.

On the administrator side, the method of remotely restrict or administrate the use of client mobile device comprises providing an interface on a mobile device or a computer allowing a user of the first mobile device or the computer to set up or configure a set of restrictions 601, transmitting, from the first mobile device or the computer, the set of restrictions to a second mobile device requesting the second mobile device to comply with the set of restrictions 602 and receiving notification from the second mobile device if user of the second mobile device inputs a wrong password to disable the set of restrictions 603. The set of restrictions should include at least time or duration the second mobile device is incapable of sending or receiving text message or phone call;

On the client side, the method comprises receiving, in a second mobile device, a set of restrictions from a first mobile device or a computer including at least time or duration the second mobile device is incapable of sending or receiving text message or phone call 604, disabling capability of the second mobile device to send or receive text message or phone call in accordance to the time or duration specified by the set of restriction 605, re-enabling the capability of the second mobile device to send or receive text message or phone call once the time or duration specified by the set of restriction has passed or when a correct password is provided and receiving, in the second mobile device, text messages that were sent to the second mobile device during the time or duration the second mobile is incapable of sending or receiving text message or phone call after the capability of the second mobile device to send or receive text message or phone call is enabled and displaying, in the second mobile device, list of phone calls made to the second mobile device during the time or duration the second mobile is incapable of sending or receiving text message or phone call after the capability of the second mobile device to send or receive text message or phone call is enabled 606. In addition, the second mobile device will send notification to the first mobile device or the computer if the password provided is incorrect.

Among other things, the inventions of the present disclosure provide various benefits and advantages. First, the systems of methods of the present disclosure allow parents to remotely administer and restrict their kids' use of mobile devices without the need to physically take away the mobile devices. Second, the present disclosure allows parents to limit their kids' access to contacts authorized by parents so that the parents or kids can still able to contact each other during the time of restriction. Lastly, the present disclosure also allows the parents to immediately apply or remove the restrictions anytime and anywhere.

It should be understood, of course, that the foregoing relates to exemplary embodiments of the disclosure and that modifications may be made without departing from the spirit and scope of the disclosure as set forth in the following claims.

What is claimed is:

1. A system comprising:
a non-transitory computer-readable medium storing software that is installed on a computer or first mobile device allowing user of the computer or the first mobile device to send, either directly or through third-party service provider, a set of instructions through internet or mobile network;
a second mobile device which receives and executes the set of instructions that include at least time or duration that the second mobile device cannot send or receive text message or make phone calls;
wherein a correct login or password or instructions from the first mobile device allows the second mobile device to send or receive text messages or phone calls; and
wherein software on the second mobile device detects if the second mobile device is moving and prevents the second mobile device from sending or receiving text messages or phone calls if the second mobile device is moving at or greater to a preset speed.

2. The system of claim 1, wherein the first mobile device or the second mobile device is a mobile phone, smartphone, tablet computer or PDA and the computer is laptop computer or desktop computer.

3. The system of claim 1, wherein the non-transitory computer-readable medium storing software is software installed on the second mobile device.

4. The system of claim 3, wherein the second mobile device sends notification to the computer or the first mobile device when an incorrect login or password is provided to disable, configure or uninstall software on the second mobile device.

5. The system of claim 1, wherein the second mobile device sends notification to the computer or the first mobile device when user of the second mobile device disables or is attempting to disable GPS function of the second mobile device.

6. The system of claim 1, wherein the set of instructions further include time and duration the second mobile device is incapable of accessing data, Wi-Fi and internet.

7. The system of claim 1, wherein the set of instructions further include the second mobile device's capability to download all or specific mobile applications.

8. The system of claim 1, wherein the software or the third party service provider stores text messages and list of phone calls that were sent or made to the second mobile device during the time or duration the ability of the second mobile device to send or receive text message or phone call is disabled.

9. The system of claim 8, wherein the software allows user of the computer or the first mobile device to delete, filter or modify the text messages and the list of phone calls.

10. The system of claim 8, wherein the second mobile device retrieves the text messages and the list of phone calls after the second mobile device is re-enabled and capable of sending or receiving text message or phone calls.

11. A method comprising:
providing a non-transitory computer-readable medium storing software comprising instructions executable by one or more computers or mobile devices which, upon such execution, cause the one or more computers or mobile devices to perform operations comprising:
allowing a computer or a first mobile device to restrict a second mobile device from sending or receiving text message or phone call for a specified time or duration;
allowing the computer or the first mobile device to prevent the second mobile device from sending or receiving text message or phone call when the second mobile device is moving above a predetermined speed;
allowing the computer or the first mobile devices to monitor, redirect, receive or filter text message sent to the second mobile device; and
sending notification from second mobile device to the computer or the first mobile devices when the user of the second mobile device is attempting to disable its GPS function.

12. The method of claim 11, where in the operations further comprises:
allowing the computer or the first mobile device to disable the camera function of the second mobile device.

13. The method of claim 11, where in the operations further comprises:
preventing the second mobile device from configuring or disabling software installed on the second mobile device.

14. The method of claim 11, where in the operations further comprises:
allowing the computer or the first mobile device to receive notification when the user of the second mobile device changes or removes the SIM card of the second mobile device.

15. The method of claim 11, where in the operations further comprises:
giving the computer or the first mobile device access to the contact list and application list of the second mobile device.

16. A method comprising:
providing a non-transitory computer-readable medium storing software comprising instructions executable by one or more computers or mobile devices which, upon such execution, cause the one or more computers or mobile devices to perform operations comprising:
allowing a second mobile device to receive a set of restrictions from a computer or a first mobile device wherein the set of restrictions include at least time or duration the second mobile device is incapable of sending or receiving text message or phone call or accessing internet;
re-enabling the second mobile device to send or receive text message or phone call or access internet once the time or duration specified by the set of restriction has expired or when a correct password is provided to the second mobile device;
making the second mobile device to notify the computer or first mobile device when the user of the second mobile device is attempting to disable or reconfigure the software or when the user of the second mobile device is attempting to disable GPS function of the second mobile device;
detecting the moving speed of the second mobile device and if the speed is greater than a preset speed, preventing the second mobile device from sending or receiving text message or phone call and accessing internet;

storing text messages that were sent to the second mobile device during the time or duration the second mobile device is incapable of sending or receiving text message and optionally resending those text messages to the second mobile device when the second mobile device is re-enabled and capable of sending or receiving text message or phone calls; and displaying, in the second mobile device, list of phone calls made to the second mobile device during the time or duration the second mobile is incapable of sending or receiving phone call when the second mobile device is re-enabled and capable of sending or receiving text message or phone calls.

17. The method of claim 16, wherein the operations further comprises:

sending a preset message to any phone number that calls or texts the second mobile device during the time or duration the second mobile device is incapable of sending or receiving text message or phone call.

18. The method of claim 16, wherein the operations further comprises:

allowing the second mobile device to notify the computer or the first mobile device when the second mobile device is not within a specified geographic location at a specified time.

19. The method of claim 16, wherein the operations further comprises:

allowing the computer or the first mobile device to choose which mobile application the second mobile device is able to access.

20. The method of claim 16, wherein the operations further comprises:

allowing the second mobile device to send or receive text message or phone call to or from predetermined authorized contacts during the time the second mobile device is executing the set of restrictions.

* * * * *